United States Patent [19]

Vilkaitis

[11] Patent Number: 4,791,556
[45] Date of Patent: Dec. 13, 1988

[54] METHOD FOR OPERATING A COMPUTER WHICH SEARCHES FOR OPERATIONAL SYMBOLS AND EXECUTES FUNCTIONS CORRESPONDING TO THE OPERATIONAL SYMBOLS IN RESPONSE TO USER INPUTTED SIGNAL

[76] Inventor: John V. Vilkaitis, P.O. Box 26, Thomaston, Conn. 06787-0026

[21] Appl. No.: 645,933

[22] Filed: Aug. 29, 1984

[51] Int. Cl.⁴ .......................... G06F 15/00; G06F 3/14
[52] U.S. Cl. .................................................... 364/200
[58] Field of Search ... 364/200 MS File, 900 MS File, 364/300, 518, 521; 340/721, 734

[56] References Cited

U.S. PATENT DOCUMENTS

| | | | |
|---|---|---|---|
| 4,176,394 | 11/1979 | Kaminski et al. | 364/200 |
| 4,302,820 | 11/1981 | Struger et al. | 364/900 |
| 4,438,505 | 3/1984 | Yamagiuchi et al. | 364/900 |
| 4,481,603 | 11/1984 | McCaskill et al. | 364/900 |
| 4,516,156 | 5/1985 | Fabris et al. | 340/709 |
| 4,553,205 | 11/1985 | Porchia | 364/300 |
| 4,555,759 | 11/1985 | McCaskill et al. | 364/300 |
| 4,677,585 | 6/1987 | Ikegami et al. | 364/300 |

FOREIGN PATENT DOCUMENTS 59-41047  3/1984  Japan .................................. 340/709

OTHER PUBLICATIONS

Carlson et al, "Device Independent Graphic Using Dynamic Generic Operator Selection", IBM TDB, vol. 25, No. 11A, 4/1983, pp. 5477-5480.

Walker et al, "Menu Display System", IBM TDB, vol. 23, No. 2, 7/1980, pp. 806-811.

Lawrence et al, "Text Command Entry and Edit on a Display", IBM TDB, vol. 24, No. 12, 5/1982, pp. 6264-6267.

Primary Examiner—Archie E. Williams, Jr.
Assistant Examiner—Thomas C. Lee

[57] ABSTRACT

A system for operating a computing machine is provided with a plurality of executable functions, each being identified by a respectively associated function symbol. In one embodiment, the data stored in a memory of the computing machine is organized into files, each such file further containing additional data which corresponds to one of the function symbols, and a selected file name which identifies the file with respect to which the executable function is to operate. In a preferred embodiment, one of the function symbols in the file is selected, and execution thereof is subsequently commanded. Preferably, the machine is returned to a state which permits selection of a further executable function. Thus, the invention forms a coupling between a transaction process and an execution process, in the form of a loop.

12 Claims, 8 Drawing Sheets

```
VIEW   ->SYMBOLS (00,00,00,00,80,24,*,*,*)          =>This is a NEW screen
                                                    =>Press ESC to ESCape
```

FIG. I

```
----------          This is the system symbol for a blank field
T>822-8255          This is the system symbol for the phone # 822-8255
```

FIG. 3

```
MAP:  ->JOHN.MAP(03,01,00,00,00,51,M,N,*)
      ->SYMBOLS(00,00,00,80,31,*,*,*)
      ->KEYS-TO.USE(63,13,00,00,00,30,W,N,*)
      ->EXPLAIN.MAP(00,00,00,80,27,*,*,*)
```

FIG. 6

```
VIEW  ->SYMBOLS(00,00,00,00,80,31,*,*,*)        =>You may EDIT

SYSTEM SYMBOLS

EXAMPLE                          EXPLANATION
-----------------        -----------------------------------------

->KEYS-TO.USE            The system symbol for the file "KEYS-TO.USE"

X->KEYS-TO.USE           The system symbol to delete the file "KEYS-TO.USE"

A>ADDUP                  The system symbol for the program "ADDUP"

S>FORM                   The system symbol for the system command "FORM"

**NOTE THIS              An example of a note field

8:00 GO TO WORK          An example of a time field
```

VIEW:    ->KEYS-TO.USE(63,13,00,00,00,00,30,W,N,*)    =>You may EDIT

Now your computer literacy problems are over.  Just press the TAB key.
Notice how the highlighted area, called a cursor, moves.  Notice the message in
the upper right hand corner of the screen, it tells you what the cursor is
sitting on.  When the cursor is on the item you want to see, press the RETURN
or ENTER key.  It is that simple.  Come on, Try it!

```
+---------------------+     +---------------------+     +---------------------+
| The TAB key moves   |     | The RETURN or ENTER |     | The ESC key lets you|
| the cursor to the   |     | key tells the       |     | ESCape back to the  |
| next symbol on the  |     | computer to DO IT.  |     | previous screen.    |
| screen. Try it.     |     |                     |     |                     |
|       ->TAB.KEY     |     |       ->RETURN.KEY  |     |       ->ESC.KEY     |
+---------------------+     +---------------------+     +---------------------+
```

Well, What are you waiting for?
       Push the TAB key!
Did you see that thing move?  That's called a cursor.  Push the TAB key
a few more times, till the cursor is in the box on the left.  Got it?
       Now press the key marked RETURN.

P.S.  For an explanation of the MAP, TAB down here to ->EXPLAIN.MAP
      and then press RETURN.

VIEW->EXPLAIN.MAP(00,00,00,00,80,24,*,*,*)

YOU'RE BEING WATCHED!

As you've been TABBING around your files, the system has been keeping a log (of sorts) of where you've been going, and how you got there. This log is referred to as the MAP.

The MAP is accessible, as a screen, and lists what screens have been previously accessed in the order that you've accessed them. You can treat this file just like all your other files: TAB to any of the file symbols listed in it, then press ENTER to view the file of your choice. The indentations are there to show you how you got from one file to another. Every file that you accessed is indented under, and to the right of, the file that you accessed it from.

There are two ways to access the MAP; either by depressing "CNTRL-K" on the keyboard, or by TABBING to the symbol S>MAP and then pressing ENTER.

If you're a novice to computers, don't think twice about all those numbers in the map, however, if you're curious as to what they mean, go reference the file ->WHIZ.KID for a detailed explanation.

To return to the previous file, don't forget, all you have to do is press the ESC key. Better yet, why don't you access the MAP and choose a file from there?

```
MAP:   ->JOHN.MAP(03,01,00,00,00,51,M,N,*)
 ->SYMBOLS(00,00,00,00,80,31,*,*,*)
  ->KEYS-TO.USE(63,13,00,00,00,30,W,N,*)
   ->EXPLAIN.MAP(00,00,00,00,80,27,*,*,*)
 ->START(04,22,00,00,80,27,W,N,*)
  ->WARGAME(58,09,00,00,80,27,*,*,*)
   ->ABOMB(45,22,00,00,80,31,R,*,*)
 ->ABOMB(31,20,00,00,80,31,R,*,*)
  ->KEYS(63,13,00,00,00,30,W,N.*)
   ->ESC.KEY(64,21,00,00,80,27,*,*,*)
    ->SOWHAT.ALT(57,21,00,00,80,27,*,*,*)
     ->SCREEN(51,05,00,00,80,29,*,*,*)
 ->ABRAHAM(23,02,00,00,80,24,*,*,*)
 ->NEWDEMO(21,15,00,00,80,86,W,N,*)
  ->CHECKBK(25,05,00,00,80,25,*,*,*)
  ->TAB.KEY(59,17,00,00,80,27,*,*,*)
   ->RETURN.KEY(20,03,00,00,80,27,*,*,*)
 ->KEYS(63,13,00,00,00,30,W,N,*)
 ->KEYS(63,13,00,00,00,30,W,N,*)
        ->ABOMB(45,22,00,00,80,31,W,*,*)
         ->WARGAME(58,09,00,00,80,27,*,*,*)
          ->FIRST(52,15,00,00,80,26,F,N,*)
           ->MORE(65,02,00,00,00,27,F,*,*)
            ->ABOMB(45,22,00,00,80,31,R,*,*)
 ->FIRST(52,18,00,00,80,26,F,N,*)
            ->DEMO(59,18,00,00,80,27,W,N,*)
             ->MYLIST(01,15,00,00,80,25,*,*,*)
             ->MYLIST(01,02,00,00,80,25,*,*,*)
             ->MYLIST(26,18,00,00,80,25,*,*,*)
             ->CALC(09,14,00,00,80,31,W,N,*)
             ->PROJK29.MEM(00,01,00,00,80,32,*,*,*)
             ->MYLIST(01,19,00,00,80,25,*,*,*)
 ->B:FIRST(69,13,00,00,80,26,F,N,*)
 ->ED(11,04,00,00,80,24,*,*,*)
 ->B:RICK(31,06,00,00,80,24,*,*,*)
  ->TODAY(57,18,00,00,80,24,*,*,*)
   ->MYLIST(00,01,00,00,80,25,*,*,*)
   ->SMITH.MEM(29,02,00,00,80,24,*,*,*)
    ->HARSMITH.DOS(10,01,00,00,80,24,*,*,*)
  ->PAYROLL(01,17,00,00,00,27,F,*,*)
 ->RICK(05,05,00,00,80,24,*,*,*)
 ->JICK(36,16,00,00,80,24,*,*,*)
 ->FIRST(52,18,00,00,80,26,F,N,*)
 ->KEYS(35,13,00,00,00,31,W,N,*)
  ->RETURN.KEY(73,22,00,00,80,27,*,*,*)
   ->ESC,KEY(64,21,00,00,80,27,*,*,*)
    ->SOWHAT.ALT(11,14,00,00,80,27,*,*,*)
     ->DIR(02,07,00,00,80,24,*,*,*)
     ->ADP(00,10,00,00,80,28,*,*,*)
                   ->B:JOHN(08,13,00,00,80,26,W,N,*)
                    ->B:RENTALS(17,07,00,00,80,24,W,N,*)
                     ->B:R120183.LST(13,12,00,00,80,34,*,*,*)
                     ->RENTALS(17,06,00,00,80,24,W,N,*)
                      ->R110183.LST(14,04,00,00,80,25,*,*,*)
                       ->388-1234(39,21,00,07,80,177,*,*,*)
```

METHOD FOR OPERATING A COMPUTER WHICH SEARCHES FOR OPERATIONAL SYMBOLS AND EXECUTES FUNCTIONS CORRESPONDING TO THE OPERATIONAL SYMBOLS IN RESPONSE TO USER INPUTTED SIGNAL

BACKGROUND OF THE INVENTION

This invention relates generally to systems for operating general purpose computers, and more particularly, to a system wherein information contained in memory is organized into a plurality of files which may additionally contain symbols which identify executable functions.

In the prior art, in order to use a computer, a user had to learn the general command structure of both the operating system and of each specific program required to fulfill the user's needs. A second option available was to hire the services of consultants or experts to perform the necessary programming to use the computer. In addition, regardless of which solution was used, perfect recall of computer requests, commands, and protocols, a facility for errorless typing, and a high level of persistance were also necessary, or at least most helpful, for using the computer in a marginally efficient manner.

Problems encountered with such prior art arrangements are that:

1. The user had to learn the general command structure of the operating system.
2. The user had to remember the names of and parameters used with the program that handled his needs.
3. The user had to learn additional commands and utilities to manage the information and other files that were created by his programs.
4. The user had to type commands without any errors in typing.
5. The computer would evaluate, perform, and then discard a user's set of commands regardless of their correctness or of the number of times that a user entered them into the computer. This would compel a user to re-enter a set of commands each time he wished to use them despite the enormous volume of computer memory available.

Most commercially available programs fall into one of the categories listed below. Although some types have been developed to simplify the operation of computers or to allow the user to organize some procedures directly on the computer, all can be characterized as forcing the user to work within a highly rigorous framework and usually have additional demands associated with their use as well.

I. Menu: menus were an attempt to relieve the user of the memory burden of operating the computer system. Here, the user was presented with series of choices and had to select one of them. Some of these choices related to general areas of endeavor, others to specific program. In general, these menus were operated either by entering a numeric code corresponding to the selection, or by moving the cursor, or some other indicators, over the menu, using specific keys, such as the arrow keys. Examples of problems with menu systems are 1. Menus were generated by others, usually for general use, thereby being not specific to the user's needs.
2. Most, if not all, menus were difficult to modify or adapt to a user's specific needs or be changed as the needs changed.
3. Often, menus were cumbersome, e.g., requiring several menu transitions before the desired program was located.
4. Several transitions could be required to traverse from one menu to another despite the fact that they may be used in sequence for a specific task. Attempts were made to alleviate this problem by allowing the user to specify the numbers of several levels of menus, e.g., 4.3.5 in order to traverse from selection 4 of the current screen, to selection 5 of the screen chosen by selection 3. This solution required one to remember strings of arbitrary, nonmnemonic numbers instead of commands that at least often had some relation to the function they performed.

Examples of menu systems are:

STARBURST, VISIon, and other similar programs which do allow the user to design his own menu trees, or similar structures, to select programs and/or files. However, they do not generally allow a user to either modify the design while the user is carrying out a series of operations on the computer or add notes that the user may wish to retain on any menu screen. In addition, VISion, among other menu programs, place considerable demands on the resources of the computer for storage and display capabilities; and IBM's SPF systen's approach, for use on IBM mainframes, provides the means by which screens can be created from which a user may choose fixed tools, programs, or access to other screen by typing a number entry from a given screen. However, the creation of these screens require that a person be skilled in the art thus cannot be altered by the average user.

II. Data Base Management Systems (DBMS's): The general idea of DBMS's is to store regular information in such a manner as to speed access to it and to enable one to produce regular reports (by "regular" we mean of a specified, fixed, and generally inflexible format). Some problems with DBMS's are as follows:

1. The complex nature of the process, of determining the requirements of the data, e.g., size, type, format, etc., and converting this to the form that a DBMS can understand was often far beyond the abilities of the average user, let alone the casual one.
2. Information had to be grouped in records having fixed format with a specific field for each specific type of information hence DBMS'S are unsuitable for irregular types of data.
3. Information is only for fixed purposes.

III. Spreadsheets: The concept of spreadsheets reduced much of the data base problems to a tractable form and generally brought about an increase in the usage of computers by the less sophisticated user. Some problems associated with spreadsheets are as follows:

1. Assumed that most data was numeric.
2. Permitted the user to work anywhere on the screen, provided that he was on a cell.
3. Rarely have provisions for interfacing functions other than those supplied, e.g., if your spreadsheet does not have trigonometric functions, it's usually not possible to integrate a simple program that would handle them into the spreadsheet.
4. Spreadsheets can "remember" the mathematics/algorithms, however there are no provisions made to remember other things like combining other screens, and you can't program them to do anything but numeric sequential operations.

IV. Windows: A fancy way of displaying the output of several programs or files on one screen. Windows have the advantages that sometimes they provide a means of moving information from one window, say a spreadsheet, to another window, say a word processor. However, windows have the following problems associated with them:

1. Generally, window systems are plagued by programs not being designed to use the smaller portions of an already size-limited screen.

2. Even with an editor, they do not provide a way of routinely chaining screens or files into a network of information V. Integrated systems: a means by which one can order and access groups of menus, files, programs, etc. These systems have the disadvantages that 1. They do not provide full control to the user.

2. Command structures are often exceedingly difficult.

Examples of integrated systems include Symphony and Framework

VI. Icons: Icons are graphic representations of a function that is provided by the computer system. Problems with icons are:

1. In general, although they allow the user to see related images, one is generally left with the arrangement of icons that the system programmer left for a hypothetical user. It is difficult to move icons to other files, if at all possible.

2. Icons can't be saved in user-created files, and in the event that you can, those files are incompatible with other programs as their format is stored like a data base file—using a specific and proprietary format.

Examples of systems using icons are in the Apple Corporation's family of LISA/Macintosh computers which use graphic images that function as commands. However, problems with such systems are that:

1. A user cannot modify the meaning of a graphic image or readily create his own without the additional use of extremely specialized skills and tools, e.g., other programs, and without placing extraordinary demands on the resources of the system's storage facility; and 2. LISA is an expensive system.

The system of instant invention departs from prior art operating systems and programs which have been used to control and operate a general-purpose computer, in that the computer's available resources are structured so that a user may use or operate the computer in a manner that complements and nearly duplicates the hierarchical and contextual nature of the user's mental processes and habits. In fact, under the system of instant invention, the very act of using or operating the computer necessarily produces a spontaneous, ordering, and reusable record, of a user's activities and interactions with the computer.

The system of the present invention relates to a method whereby the computer's output or display device is used as an interface on which a user, including one unskilled in the art, is free to input and edit directly whatever data or commands are pertinent to the activity which have been chosen to be performed. Data, as interpreted in this system, may include any form of information, e.g., normal text or graphics, notes or memos to the user, or commands to the computer or its peripherals. Furthermore, the user is not restricted to following a prescribed or rigorous format when preparing an interface, i.e., an interface may be configured in the manner most appropriate to the purpose at hand. Thus, it is an object of this invention to provide a user with a facility to organize information and operations on a computer in a manner reflective of the user's own logic, style, and needs.

Another element to the system of the present invention is the manner in which a user designates commands to the computer or its peripherals on an interface. Each general class of commands to the computer or its peripherals is uniquely associated within the system to a specific class of system symbols. Each class of system symbols, in turn, is associated with its own general form of representation which is consistently applied whenever a specific instance of the class is to be represented on an interface. Thus, it is another object of the invention to standardize and simplify the symbolic representation of any command to the computer or its peripherals on an interface.

Furthermore, the instant invention is capable of incorporating any command to the computer or its peripherals into its system in the form of a system symbol. It is another object of the instant invention to provide a system whereby any command to the computer or its peripherals may be incorporated into the system and expressed on an interface in the form of a system symbol so that it may be integrated into the system, as will be explained below.

The system also provides a consistent means by which a user may instruct the system to invoke any command to the computer or its peripherals, ie., the implicit request contained in any system symbol, on an interface. The method consists of a user performing a simple 2-action command: the first step allows the user to select which particular system symbol listed on the interface will be invoked and the second step will cause the system of the instant invention to automatically invoke its associated command to the computer or its peripherals. Significantly, this process may be directly initiated by the user at any time, i.e., the user may cause the system to search for and identify a system symbol and then invoke the command associated with that symbol immediately after it has been designated on an interface, or any time thereafter. Thus, it is still another object of the instant invention to enable a user to instruct the system to search for and identify, and also execute, the associated computer, or computer-controlled, command or function of any system symbol designated on an interface by a single, standardized method and, also, to be able to apply consistently this same process at any later point in time.

It is still another object of the invention to provide the operator of a computer with a reusable record of his prior interactions with the computer by automatically storing in a memory all newly created interfaces among the various files, or edited version thereof, in the form of a further file which may be recalled by the user at any time, as further explained below.

Thus a prime object of the system of the instant invention, by logical extension of the aforementioned objects, is to provide a means whereby the very act of a user using or operating a computer is the practical equivalent of the user creating a reusable interface which records all the specifics of that interaction.

Another command basic to the system of the present invention is the escape command. This command permits a user to backtrack between successively viewed screens without having to issue to the system any specific references to the preceding screen or screens. Thus, another object of the instant invention is to standardize the means by which a user may backtrack between, and view, any number of previously viewed files.

Another element principal to the instant invention is the system's hierarchical semi-stack processor, referred to herein as the "file map", or, more simply, the "map". Basically, the file map functions within the system as a storage unit wherein information identifying the files a user has accessed, and the latest status of each of these files within the system, is compiled and maintained by the system.

The file map is maintained by the system in reusable mode, i.e., in the form of a file which may be directly accessed by the user. In addition, and of central importance to the functioning and utility of the file map, the list of previously viewed files is maintained in system-integratable form, i.e., system symbols are used to designate the files listed in the map instead of the file names alone. This structuring of the file map permits a user to treat the map in a fashion similar to any other file within the system, as explained above.

Accordingly, it is a further object of the instant invention to provide a facility which both records and displays the relationship between the files that a user has accessed within the system and to provide a means whereby a user may utilize this facility either to access rapidly files, even if deep within the hierarchy of a related set of files, or to perform very rapid context switching between sets of files that are not conceptually related but that are both contained in the record.

The file map is also called upon by the system to provide whatever information is necessary for the system to restore a file, or the machine, to its status at prior termination whenever the system is so instructed. Thus, two other objects of the instant invention are to provide a method whereby a previously viewed file may be redisplayed by the system and whereby the user may easily exit and re-enter the system directly back to the exact position at prior termination.

A still further object of the invention is to provide a method whereby externally created files may be integrated for use into the structure of the system, irrespective of whether they are stored in on-line memory or transmitted as a data stream to a computer utilizing the system.

The system of the instant invention may also be incorporated for use in virtually any device having an imbedded computer, and most especially in those where there exists a requirement for a user to interact with the device. Thus, it is a further object of the invention to provide a system whereby the use, operation, or programming of a device may be simplified, standardized, and/or structured in the same manner as specified in the above listed objects.

General problems with information storage and retrieval when a request is not stated or formated correctly are the problems addressed in U.S. Pat. No. 4,068,298. In this known system, the seed module solution to those problems is quite different and the problem approach therein is more general than that of the instant invention.

An aid to an inexperienced user in directing a numerically controlled machine is disclosed in U.S. Pat. No. 4,010,356. The use of error messages, which force the user into the computer's method of operation, rather than the other way around, is still at the heart of this known system. As described in this reference, the computer accepts or rejects the user's responses rather than the user controlling the computer.

A series of patents assigned to Westinghouse attempt to set forth an operating system to aid the layman in programming. These patents include U.S. Pat. Nos. 4,215,406; 4,215,407; and 4,227,245. The patent set forth an interface system between the user and a computer system which has a certain degree of flexibility. However the solution proposed in these patents fails to provide the simplicity for the user and the extreme flexibility provided in the instant invention.

In the context of a word processing system there has been a method disclosed in U.S. Pat. No. 4,308,582 of defining initial processing parameters which aid inexperienced users. Although the instant invention can be used for word processing, it also has numerous other uses.

The use of hierarchical structures without scanning their contents is disclosed in U.S. Pat. No. 3,938,104. However, this reference does not disclose a hierarchical semi-stack processor which would provide to the operator a history of system use.

Finally, an interesting approach to making a computer think like a person, or at least in a way that complements the natural thinking of a person is set forth in U.S. Pat. No. 4,374,412. In this known system, the use of finate state machines in a natural grammar is again a quite different solution to a much broader problem than that addressed by instant invention.

SUMMARY OF THE INVENTION

The foregoing and other objects are achieved by this invention which provides a method of operating a computing machine of the type which has an output device, illustratively a display via which is presented data stored in a memory. The data is separated into a plurality of files, each of which has an associated file name. When a file is called by the operator of the computing machine, at least a portion of the data in the memory associated with the file thus called is presented on the display. In accordance with the invention, a plurality of executable functions are defined and identified by respectively associated function symbols. Selected ones of the files contain further data corresponding to at least one of the function symbols and a file name which identifies a file with respect to which the executable function associated with the function symbol is to operate. Upon calling one of the selected files containing the further data so that the data in the file is presented on the display, the executable function identified by the further data may be executed.

In accordance with the invention, the execution of the executable function may simply result in the calling of the file specified in the further data. Alternatively, a new file, identified as specified in the further data, may be created. Any of several other functions may also be performed in accordance with the invention. For example, the additional data may specify that a program stored ina specified file is to be run. Alternatively, a specified file may be deleted.

Further in accordance with the invention, a listing may be produced of the files which are called to the display, including the sequence in which such files were called. Such a listing may itself be treated as a file and called to the display. In certain embodiments of the invention, the listing of the sequence in which the files have been called, including a record of the file most recently presented on the display, including information pertaining to the particular portion of the data displayed and the location of the cursor thereon, may be produced automatically without the need for an operator-generated function symbol.

It is to be noted that certain ones of the executable functions need not refer to files, but may instead refer to the data itself on which the function is to operate. For example, a function symbol indicating execution of a telephone dialing function may be followed by the particular telephone number to be dialed.

In a known manner, the system of the present invention performs initial housekeeping procedures upon invocation. Such procedures include clearing of the screen and monitoring to determine whether the program system itself is properly loaded. If the program of the system is not properly loaded, a message to the user and termination will ensue.

Upon proper loading of the program, control is passed to a file map load routine which calls regular loading routines to request the operating system of the computer to locate and load the file map, which corresponds to a history of usage of the system. The regular loading routines also regenerate and update the file map header record to reflect properly the name of the file map and to regenerate the width and record count of the file map. The record count, which corresponds to the length of the file, is set so that a minimum of one screenful of lines is present in a file. If no such lines are found, blank lines are inserted. The width count is set to the greater of the actual width count of the file, or the width count of the file, as supplied by the file map header record. The information contained in the updated file map header record is then returned to the file map loading routine. Subsequently, the file map load routine determines whether the file map has been loaded, and if no file map has been loaded, a dummy file map containing a single entry for a blank screen is generated.

On the basis of the information stored in the file map, the file map load routine determines and redisplays the state of the program system prior to the last time the system was terminated. In a preferred embodiment of the invention, the system determines and redisplays the file which was last displayed before the previous termination, the specific screen which was last displayed within the file, and the position of the cursor when the screen was last referenced.

Upon completing the foregoing, control is passed to a main loop which is the highest level organizational mode in the program system. The main loop is concerned with initiating transactions wherein the operator interacts with the file and/or screen, and executing the requests resulting from those transactions. The transact-execute loop is reiterated until the program is terminated by the operator or the operating system.

The main loop consists of a transaction process and an execution process; control being shifted therebetween in accordance with the principles of the invention. The transaction process determines the type of transaction to be performed on the currently loaded file, based upon the header record of that file, and invokes that transaction's associated routine to perform the transaction. In a preferred embodiment of the invention, the transaction process selects between normal, advance, and exec modes of operation. In addition, the transaction process regenerates the header record of the file to reflect the current state of the file and to update the information pertaining to the file contained in the file map. Subsequently, control is returned to the main loop.

The main loop calls up the execution process to carry out the request implied by the information returned from the transaction process. After such execution, control is returned to the main loop which calls up the transaction process to begin the cycle once again.

As indicated, the main loop calls up the transaction process to determine the type of transaction to be performed and to invoke, in a preferred embodiment, one of three options indicated above. In the normal mode, the user can create and alter files, substantially in an editing or word processing context. The routine of the normal mode updates the screen to reflect the current state of the file and waits for the operator to indicate the next desired action. If the user requests a word processing function, the editing-word processing facility will take appropriate action and then return control to the routine of the normal mode.

A further function of the subject program system, while in the normal mode, is the symbol scanning routine which is activated upon manipulation of a search key. In a preferred embodiment, the search key is selected to the be TAB key of the computer keyboard which initiates the search key routine and subsequently the symbol scanning routines. The symbol scanning routines automatically advance the cursor to the next item in the file. If there does not exist a next item, the scan is restarted at the top of the file and continues until the entire file has been scanned. Subsequently, symbol identification routines examined the results of such scans. However, if the scans return an indication of failure, such as that the cursor is not currently positioned within the immediate vicinity of a symbol, then the process repeats once again. However, if a valid request code is returned, the information thus received is returned to the symbol scanning routines.

The symbol identification routines determine whether or not the cursor, or an equivalent marker is resting within the immediate vicinity of an item. As indicated, if the cursor is not in such a vicinity, then an indication of failure is returned to the symbol scanning routines.

As indicated, the search key routine evaluates the information returned after execution of the symbol scanning routines. If a symbol is found, the request code and associated position and descriptive information is returned to the normal mode routine. Such information includes the formal cursor position. On the other hand, if no symbol is found, such as that the symbol scanning routine returns an indication that it has encountered an end of the file, then the search key routine reinvokes the symbol scanning routine at the top of the file and issues a message to the user. Scanning continues until the entire file has been scanned. If a symbol is found, the formal cursor position is established at the proper location and the information is returned to the normal mode routine. However, if no symbol is found in the entire file, the cursor is retained at its original position in the file, the user is issued an appropriate message, and the information is returned to the normal mode routine. The screen is then updated to reflect the current state of the file, and the normal mode routine is repeated.

A further function of the subject program system, while in the normal mode, is the execute request processing routine which is activated upon manipulation of an execute key, such as, in certain embodiments, the RETURN/ENTER key of a known computer. In a preferred embodiment, the execute key is selected to be the RETURN key of the computer keyboard. Upon activation, control is passed to the execute request processing routines which verify that the cursor is within the bounds of an executable symbol. If it is not, an appropriate message is issued and appropriate indicators are returned to the normal mode routine. The code for the execution request, the information regarding the corrent position of the cursor, and other descriptive information is then returned to the transaction process. Alternatively, the user may request map and escape functions which subsequently return their respective codes to the transaction process.

During the advance mode routine, the screen is updated to reflect the current state of the file,and the appropriate symbol scanning routines are called up to advance the cursor automatically to the next item in the file until the next instance of a symbol in the file is located, as described hereinabove. The advance mode routine then examines the information which has been returned to it, and control is then passed to the normal mode routine. Thus, the net result of the advance mode is to simulate the user manipulating the search key to place the cursor in the vicinity of the next identifiable symbol.

When the transaction process is operated in the EXEC mode, the EXEC mode routine updates the screen to reflect the current state of the file and calls up the appropriate symbol scanning routines which automatically advance the cursor to the next item in the file, as described hereinabove. Additionally, the symbol scanning routines examine the information provided by the symbol identification routines. If a command request code which does not represent a potentially executable syumbol is returned, the process repeats itself. However, if a command request code does represent a potentially executable symbol, then the symbol scanning routines return this information, the information regarding the current position of the cursor, and other descriptive information to the EXEC mode routine.

The EXEC mode routine determines whether or not the symbol scanning routines found a potentially symbol. If one is found, this routine updates the display to reflect the current position of the cursor, although such updating is not essential. In this case, the command request code representing the executable symbol is returned to the transaction process. On the other hand, if such a symbol is not found, the cursor is reset to the top of the file and an escape request code is returned to the transaction process. Thus, the net result of the EXEC mode is to simulate the user manipulating the search key and the return key.

After the EXEC, ADVANCE, or NORMAL mode routines have completed their functions, control is returned to the transaction process. Subsequently, the transaction process updates the header record in the file and updates the file symbol and its parameters in the file map, and returns control to the main loop. At this point, the appropriate codes and pointers have been set to indicate the type and location of the symbol representing the user's request so that the transaction and execution processes can pinpoint the location of the command within the file at a later time in the event that the file and cursor position need to be redisplayed or saved.

In addition to the foregoing, the main loop also invokes the execution process using the information noted hereinabove, and based upon the request code, generated by the transaction process, determines which routine is required to carry out the request by the request code. In a specific illustrative embodiment of the invention, nine such routiens are provided:

1. A routine to load or create and view a file.
2. A routine to escape from a file to the previously viewed file.
3. A routine to delete a file.
4. A routine to create a full or partial listing of existing files.
5. A routine to view and edit the file map.
6. A routine to run other programs.
7. A collection of routines to handle specialized requests dealing with the system's parameters and configuration information
8. A routine to dial a telephone number via a modem or other device.
9. Any other routine and symbol handlers as added to the system.

Once these routines have completed their functions, control is returned to the execution process, which then returns control to the main loop. Of course, not all of the foregoing routines need be provided in each embodiment of the invention, and persons skilled in the art will readily comprehend that other routines may be included to meet the requirements of other environments.

The routine to load or create and view a file checks to determine whether or not the file name is valid, for purposes of compatibility, since the program system of the present invention only accepts as valid those file names which correspond with CP/M naming conventions. Such compatibility, however, can be altered to conform to the particular naming conventions of any operating system. In the event that the file name is not valid, a message is displayed and control is returned to the execution process. In addition, the routine to load or create and view a file checks to determine whether the current file has been edited or altered, and if so, then attempts to save the file. It should be noted that under certain conditions, such as when a disk is full, or when disks or storage units are swapped, the file cannot be saved. However, the subject program system and the operating system of the computer each have strategies for dealing with such problems. If an appropriate display-file-map flag is set, the file map is displayed between the two files as the current file is being saved. However, if a do-not-display-file-map flag is set, then a message is displayed on the screen as the file is being saved for purposes of advertising and indicating to the user that a file-save is in progress.

The routine to load or create and view a file inserts into the list of file names in the file map below the current file symbol the file request symbol, as through the file map were a normal file. Additionally, an effort is made to locate and load the new file, and if this fails, a new, empty file having the same name is created and the operator is informed to this effect. The header information from the file to be viewed is then merged with the symbol, and possibly other information, already in place on the file map. Subsequently, control is returned to the execution process.

The routine to escape from a file to the previously viewed file first locates the current entry on the fi le map, and if the current file has been altered, an attempt is made to save the file, as described hereinabove. Additionally, the routine references the previous entry in the file map and attempts to load it. If there was no prior entry, or if the file cannot be found, the user is informed of this and given the opportunity to change the information storage units or to choose any entry on the file map. Control is then returned to the execution process.

The routine to delete a file attempts to determine whether or not the specified file exists. If the file does not exist, a message is issued to that effect. On the other hand, if the file does exist, the file is deleted and an appropriate eulogy is delivered to the user. Control is then returned to the execution process.

The routine to create a full or partial listing of existing files performs initial housekeeping procedures within the routine to initialize variables, counters, and pointers to be used by the query process. Additionally, this routine issues the appropriate request to the operating system to find a match between the ambiguous file name and the symbol and the first instance of a file name which matches the unambiguous portion, if any, of the ambiguous name. If the first search fails, a message is issued to the user and control is returned to the execution process. The prototype line, which is the line containing the request, is then duplicated and inserted into the file and the ambiguous name embedded in the request is replaced with the specific instance of a matching name which was found. A request is then issued to find another matching name. If no further matching name is found then the cursor is set to point out the topmost instance that was found and control is returned to the execution process. Alternatively, if another matching name is found, the prototype line is again duplicated and inserted into the file and the ambiguous name embedded in the request is replaced with the specific instance of the matching name. The net result of this routine is that a list consisting of the matching file names found is generated within the current file.

The routine to view and edit the file map saves the current file, initializes the appropriate variable so that the current file pointer is actually pointing to the file map, and control then passes to the normal mode editing-word processing facility with all pointers set to point to the file map. If the editing-word processing facility returns with the file map request code, then the file map request code routine proceeds to reset the pointer to the topmost file and saves the file map and loads the topmost file. If the editing-word processing facility returns with a file request code, then control is returned to the execution process.

The routine to run other programs makes the appropriate arrangements with the operating system to take the information contained within that symbol on the screen and reformat it if necessary to fit the conventions of the operating system, whatever they may be. Additionally, this routine requests that the program be run by the operating system in a manner appropriate to the particular operating system. The actions beyond this point are extremely dependent on the operating system in use. Generally, any of the three following situations may result:

1. The program system of the present invention may be terminated by the operating system and therefore must be reloaded from the beginning. However, the status of the program at such termination will be saved so that the machine will be restored to the state it was prior to termination.

2. The present program system will be permitted to remain resident while the program is being run by the operating system. Upon completion of the program, the present program system will resume execution.

3. The present program system will continue running and the program will be reformed as a subtask or some other subservient entity on the same or associated processors, depending upon the hardware configuration.

The collection of routines to handle specialized requests dealing with the system's parameters and configuration information, illustratively referred to as "system commands", all eventually return control to the execution process which then passes control to the main loop. All such routines are invoked when the request codes sent to the execution process indicate that the symbol is a system command symbol. The system command symbol is then inspected to determine which of the routines should be called to handle the specific system command. Such system commands are as follows:

1. File map commands set the file map display flag indicator in the header record of the file map file to indicate whether or not the program system of the present invention will display the file map whenever a new file is referenced. By operation of a particular sequence of key strokes or other inputs, the indicator may be cleared to indicate whether the file map should or should not be displayed.

2. Read/write permit level commands set the read/write level access indicator in the current file's header record to indicate what level of alterations are to be permitted to the file by the editing-word processing facility. The level of alterations may range from none being permitted to full word processing functions being performed on the file.

3. Automation level commands set the automation level indicator in the current files header record to indicate to the transaction process which routines are to be used to process transactions to the file. The routines include the EXEC, ADVANCE, and NORMAL mode routines.

4. Various miscellaneous systems commands wherein the execution process proceeds to execute the routines may be specified to call, (1) the same routine that the transaction process calls for the escape key thereby executing an escape out of the file as explained hereinabove; (2) a routine which clears the flag that indicates that the file has been altered and then calls the same routine that the transaction process calls for the escape key thereby permitting a user to quit the current file without saving any edits performed on that file during the current session; (3) a routine which calls the same routine that the transaction handler calls for the file map request code thereby permitting access to the map; or (4) a routine which provides an "escape hatch" to the operating system of a computer.

A routine to dial a telephone number via a modem or other device points to the dialing command necessary to alert the modem that a telephone number follows. This routine also points to the portion of the text just beyond the telephone number portion of the symbol and sends that to the output port. Control is then passed to the execution process.

As noted above, a significant aspect of the present inventive program system is the production of a map file which is a modified stack, designed to show the hierarchical relationship of the files, to provide a limited historical record of the user's references, and to allow the user to treat this record as a menu of previously accessed files. The map file is a modified stack in that as new files are pushed onto the stack, they are inserted into the listing, rather than placed onto the top of it. In a particularly advantageous embodiment of the invention, the stack is displayed upside down from the usual stack orientation and accordingly, the first entry on the stack is at the top of the display, rather than at the bottom, as would be the case with a conventional stack. As each entry is entered into the stack, it is indented by an amount which reflects the current depth of that entry. This assists in displaying the hierarchical relationships of the files in a manner similar to that of an indented outline. Thus, files referenced from other files appear beneath and indented to the right of their parent files. In a preferred embodiment, as files are eliminated from the stack, rather than having the name of the file destroyed, the current position indicator is merely moved towards the end of the stack, which is shown at the top of the display. The next file to be accessed, as the files are popped from the stack, is not necessarily the next file on the stack, but rather the next file on the stack having a higher level in the hierarchy than the current entry. Thus, the file that will be accessed will, unless the map file has been altered by the user, be a file from which the current file was accessed. The file which is therefore accessed is the parent of the current file.

All entries to the map file are made in the form of valid file symbols, thereby allowing the system to use the same routines to process stack entries and file symbols, and allowing the user to reference these symbols as though they were a list of file names.

It is significant to note that the map file is treated as an ordinary text file, thereby allowing the system to use the text processing routines to access the file symbols on the stack, and allowing the user to reference the map file as though it were a text file containing a list of files that a user, human or otherwise, may access. These characteristics of the map file allow the user to use the stack as a means of rapidly accessing files that have been previously referenced, without traversing all of the files that have been traversed to access the file in the first place.

BRIEF DESCRIPTION OF THE DRAWINGS

Comprehension of the invention is facilitated by reading the following detailed description in conjunction with the annexed drawings, in which:

FIG. 1 is a representation of a blank screen having a header record of the file symbol;

FIG. 2 is a representation of certain system symbols used in the practice of the specific illustrative embodiment;

FIG. 3 is a representation of a system symbol for a blank field and a telephone dialing symbol;

FIG. 4 is an illustrative representation of a file called "KEYS-TO.USE";

FIG. 5 is an illustrative representation of a file designated "→EXPLAIN.MAP";

FIG. 6 is a representation of a file map that would result from the practice of one specific embodiment of the invention;

FIG. 7 is an illustrative representation of a further file map;

DETAILED DESCRIPTION OF A PREFERRED EMBODIMENT

Figure 8:
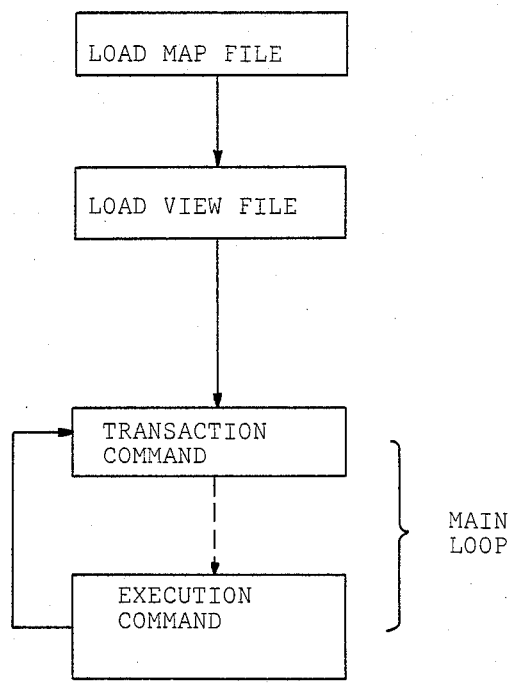
FIG. 8 is a simplified function block diagram of the program process of the present invention.

The program system of the present invention can be implemented in a variety of computer systems and for a variety of purposes. One preferred use involves a conventional personal computer having central processing units, auxiliary memory, a keyboard as a user input device, and a display screen as an output device to the user. In addition the present method for operating such a computing machine can be implemented in different versions which include word processing functions within it. Although one particular, illustative level of word processing function on a TeleVideo TS 803 personal computer will be set forth as the preferred embodiment of the invention in this disclosure, it should be understood that the specific level of word processing available, the particular word processing commands, and the method of their implementation are not part of the instant invention.

INTRODUCTION

The present inventive system for operating a computer incorporates four basic elements, including display screens, system symbols as a unique class of information within the system, a plurality of commands intrinsic to the system which standardizes and simplifies the use and operation of the computer, and the file map. To facilitate the explanation of the particular mechanics of, and interrelationship between, these concepts within the system, a general overview of the system and a set of definitions, to be applied throughout, will first be presented.

THE DESIGN AND USE OF SCREENS

FIG. 1 represents a screen 1 entitled "Symbols" as initially created. (For a discussion on the creation of screens, see the section of this disclosure entitled "File Symbol, Continued", below.) With the exception of the HEADER RECORD, i.e., that entity in the upper left-hand corner and a user prompt in the upper right-hand corner, the screen is otherwise blank. Although not directly ascertainable from any pictorial representation, any newly-created screen is in NORMAL MODE, i.e., that mode wherein a user is free to enter information of any nature directly onto the screen in non-rigorous format by means of the system's word processing/editing facility.

In order to explain further the concepts of the present program system, this user has decided to enter a table listing examples of the basic SYSTEM SYMBOLS used in the preferred embodiment onto the screen "Symbols". By simply typing the desired information directly onto the screen, an edited version of the screen "SYMBOLS" will be produced, as in FIG. 2.

DISTINCTIONS BETWEEN SYSTEM SYMBOLS AND NORMAL TEXT

The second basic element to the program system of the present invention is the representation of certain classes of information in the form of SYSTEM SYMBOLS. There are eight basic classes of system symbols used in the specific illustrative embodiment of the invention: the file symbol 2, the delete-file symbol 2, the program symbol 4, the system command symbol 5, the blank field 6, the note field 7, the time field 8, and the telephone number symbol 9. Examples of six out of these eight classes of system symbols have been listed in the table in FIG. 2. The remainder of this screen is comprised of NORMAL TEXT, i.e., any information that is not formulated on the screen as a system symbol, e.g., normal text or graphics. Thus, for example, all of the accompanying explanations and headings in FIG. 2 are categorized as NORMAL TEXT.

The distinction between system symbols and normal text is entirely synthetic, i.e., system symbols differ from normal text only because they have been defined as such to the system of present invention. More specifically, system symbols differ from normal text in that their unique form has been defined to the system's SYMBOL IDENTIFICATION ROUTINES, which permit the system to search for and identify the next instance of a system symbol on a screen, as further explained below.

There is another basic distinction between system symbols and normal text: each class of system symbols may also contain an implicit request to the program system to carry out a command to the computer or its related peripherals. More formally stated, each class of system symbols may be associated with one or more EXECUTION SUBROUTINES in the system that carry out the action associated with that class of system symbols.

THE TAB, RETURN, AND ESCAPE COMMANDS

The third basic element of the present program system is to facilitate operation of a computer in a standardized fashion by means of the three commands intrinsic to the present program system. The means whereby the system achieves this objective is directly associated with the use of system symbols to denote computer-related functions or operations on a screen. It is due to the association of each class of system symbols with its own symbol identification routine, and where applicable, its own execution subroutine, that the system is capable of elegantly reducing the invocation of all computer-related functions or operations specified on a screen to two basic commands. The first command instructs the system to locate and identify the next instance of a system symbol on a screen thus allowing a user to select which symbol is to be invoked, and the second command instructsthe system to invoke the request implied by that system symbol.

In the specific illustrative embodiment, the command which locates and identifies the next instance of a system symbol on a screen, the IDENTIFICATION COMMAND, is invoked from the keyboard by depressing the TAB key. Each time the user presses the TAB key, the program system's SYMBOL INDICATOR will visually identify the next instance of a system symbol in the file. Within the current preferred embodiment, the SYMBOL INDICATOR takes the form of a reverse-video block cursor, thus each time the user invokes the TAB command, the next instance of a system symbol is highlighted on the screen. In addition, in the current preferred embodiment, the symbol indicator acts as a cursor which the present program system enlarges to a highlighting block cursor which encompasses the entire system symbol whenever the actual character cursor is moved within the bounds of whatever the system identifies as a valid system symbol on a screen. The character cursor remains visible designating the particular character within the bounds of the symbol designating the position where an input character would be placed if typed. Thus, the user may, if desired, move the cursor by other means, e.g., cursor-control keys, to select and have identified a system symbol designated on a screen. However, the TAB command remains the sole means by which a user instructs the present program both to scan for and to identify the next instance of a system symbol in the file.

Once a system symbol has been thus selected, the second program system command, the EXECUTION COMMAND, may be invoked by the user to request the system to carry out the implied request, if any, contained in that system symbol. The execution command is invoked from the keyboard by depressing the ENTER key.

To eliminate confusion over the meaning of a particular system symbol, each time a system symbol is highlighted by the block cursor, the embodiment of the present program system will display in the upper right-hand corner of the screen an ordinary message, in English, which succinctly explains the meaning of that symbol, or, what the present program system will do if the user invokes the execution command. For example, if the reverse-video block cursor were resting on a FILE SYMBOL, the program system would display the following message: "To view this file, press ENTER." In addition, should a user press ENTER while the block cursor is resting on a system symbol that does not contain an implied request, i.e. the symbol is not associated with any execution subroutine in the present program system, it will so inform the user and wait for the user's next input.

The third command intrinsic to the present embodiment of the program system is the ESCAPE COMMAND. The ESCAPE COMMAND instructs the system to save the latest version of the present file to disc or auxiliary memory if it has been edited or altered in the current session and "escape back" to the previously viewed file; (I.E. the current hierarchical parent from which that file was last referenced.) without the user having to instruct the system beforehand of any particulars. This command is invoked from the keyboard by depressing the ESCAPE key and may be successively invoked by a user, i.e., a user may retrace his steps one screen at a time back up, if necessary, to the first screen by depressing the ESCAPE key the requisite number of times. When a user ESCAPES out of a file and the system saves the current file it will also save the exact position of the SYMBOL INDICATOR within that file. Thus, when the user next returns to that file, the SYMBOL INDICATOR will be resting in the same position as when the file was last viewed.

A special form of the ESCAPE command is the system's QUIT command. This command is invoked from the keyboard by depressing " ^ Q". Like the ESCAPE command, the system will respond to the QUIT command by redisplaying the previously viewed file, however, the system will not save in a magnetic disc, or other auxiliary memory, any changes performed on the current file during that particular session. As will be explained below, the QUIT command is the only means whereby a user may instruct the program system to leave a screen unchanged from the prior session on disc or in auxiliary memory, i.e., not to save any edits or alterations performed on the file during the current session.

As a convenient shorthand, the terms TAB, ENTER, and ESCAPE will be employed herein to denote the invocation of their associated commands.

THE CLASSES, FORMS, MEANINGS AND USES OF SYSTEM SYMBOLS

PART I

THE FILE SYMBOL

The first system symbol listed in FIG. 2 is an example of the class (or category) of system symbols used to represent a screen or file. The system's FILE SYMBOL 2 is composed of two distinct parts. The first part, the "minus/greater than" arrow, indicates that the symbol represents a file name, the second part, in this case "KEYS-TO.USE", indicates specifically which file name is represented. In general, any file name can be transformed into a system file symbol by prefixing the name of the file with the "minus/greater than" arrow.

The implicit request contained in a file symbol is for the program system to cause to be saved the current file to a storage disc or auxiliary memory if the user has performed any alterations on the file during the current session, and then locate and display that file whose name is specified in the second part of the chosen file symbol. Thus, in the preferred embodiment, if a user TABBED to a file symbol and pressed ENTER, the program system would first save the current file to disk (assuming that edits were performed during the current session) and then display the screen or file specified in the chosen file symbol, replacing the previously displayed file on the display.

Thus, if the user was viewing the screen "SYMBOLS", as depicted in FIG. 2, edited the file so that it included the additional text as in FIG. 3, TABBED to the file symbol "→KEYS TO. USE" 2, and pressed ENTER, the system would first save the newly edited version of the file "SYMBOLS", including the exact position of the block cursor, and then display the file "KEYS TO.USE" 10, see FIG. 4. From the file "KEYS TO.USE" 10 the user may choose to view any of the files designated in that file by simply TABBING to its associated file symbol and then pressing ENTER. So, as in this example where more than one file symbol is designated in the file, a user could TAB to the file symbol "→EXPLAIN.MAP" 11, press ENTER to view that file 12, see FIG. 5, do whatever is necessary and return back to the first, or home, file "KEYS TO.USE" by simply pressing ESCAPE, to choose whichever of the other screens is then necessary. Alternatively of course, the user may choose to continue moving forward in the system by electing to view a file designated on "EXPLAIN.MAP" 12, etc.

Before continuing this disclosure of the file symbol and the other classes of system symbols, it would be useful to introduce the fourth basic element of the program system, the FILE MAP, and its function within the system.

THE FILE MAP

As a user transfers from a home screen to succeeding screens, and from these to further screens, the program system of the present invention is automatically compiling a file which tracks these activities. This file is the FILE MAP. Technically, the FILE MAP is an ordered collection of specific file information created and maintained in the form of a file by the present program whenever files are referenced through the system, the primary purpose of which is to serve as a storage mechanism wherein the system may deposit, access, and update the information specifying which files a user has accessed and the information necessary to redisplay each of these files to their exact status as last viewed in the system. The particular mechanics involved and information stored during the compilation of the file map may differ in specifics, depending on the needs of the computer system involved; however, the file map as structured and compiled in the preferred embodiment can serve as an illustration of the general principles involved.

FIG. 6 is a representation of the file map 13 that would have been compiled by the present program system if a USER referenced the files used in the examples above. Starting with the home screen "SYMBOLS", it will first be noted that its entry in the file map consists of its associated file symbol, i.e., "→SYMBOLS", not just its name, and is followed by additional information. This entry will be referred to herein as a file's HEADER RECORD. Although various other structures could be utilized for this purpose, header records, as designed for use in the preferred embodiment, are particularly suited for integration into the program system and to maximize the utility of the file map.

Each file's header record is compiled by the program system and is used to store at least that file's current status within the system, i.e. that set of parameters which are used to retain the characteristics of a file so that when the file is re-referenced it may appear in exactly the same manner as it was when last referenced. For example, in the current preferred embodiment the following information is stored in a file's header record:

1. the position of the block cursor, i.e., the cursor's x,y coordinates, when the file was last referenced,
2. the position of the file, i.e., the particular page within the file, when the file was last referenced,
3. the maximum allowable width and the length of the file,
4. the transaction mode that the file was in, i.e., EXEC, ADV, or NORMAL MODE, when the file was last referenced, as further explained below,
5. the file protection level at prior termination, as further explained below, and
6. provision for additional information should the need arise.

In general, each time the present system receives instructions to load a file, it also inserts that file's current header record into the file map after the current position pushing the other, now inactive header record entries one position deeper. In the current preferred embodiment, insertion is done in a hierarchical or outline form to reflect the access level of a file within the system. Using FIG. 6 as an illustration, the file "KEYS TO.USE" 14 was accessed from the file "SYMBOLS", thus its header record is appropriately indented to reflect the "parent-child" relationship. Similarly, the file "EXPLAIN.MAP" 15 was accessed from the file "KEYS-TO.USE" 14, thus its header record is indented further in the listing to reflect the fact that it was so accessed; as can be seen, there may be several levels of indentation reflecting the access through multiple levels of files.

Whenever a user leaves a file, the system will regenerate its header record, i.e., update the information specified in the current header record to reflect the final status of that file, then replace the current header record in the file map with the updated version.

For purposes of convenience, in the preferred embodiment the header record of a file is stored as the first record in the in-memory file, i.e., the first line in a file. However, the general principle to be noted is that the header record is always updated by the present program system to reflect the latest status of that file regardless where it is stored.

The information contained in the file map is also used by the program system in the preferred embodiment when a user initially loads the system, i.e., when the program system issues instructions to itself to load a file. In the current preferred embodiment whenever a user enters the system, the system will first load the file map and, based on the information stored in it, will then determine and redisplay the state of the system before prior termination. In other words, the program system will redisplay the final file viewed before the system was last terminated as specified in the file map. In the event that the system cannot locate that file, the system will so inform the user and display a default file.

The file map therefore provides a convenient means by which a user may re-view a file exactly as last viewed, or exit and re-enter the system itself without difficulty or discontinuity. The latter point is especially important under certain conditions, external to the system itself, as further explained below. Additional mention will also be made at this point to emphasize that the re-displaying of a file by the program system includes not only loading and displaying that file, but also positioning the file and the symbol indicator/cursor on the screen back to their exact position as when the file was last displayed.

One of the most useful features of the system is that the user can easily call up the file map and treat it like any other file, i.e., he can TAB to any file symbol listed in the map and press ENTER to gain direct access to the file instead of ESCAPING backwards successively or having to type a file symbol onto a screen. In the preferred embodiment of the instant invention, the file map can be called up by pressing " ^ K" on the keyboard. If " ^ K" is pressed successively a second time, the program system will automatically cause the first, or home, screen in the map to be redisplayed. Referring to FIG. 7, another file map 14 but longer in length than that depicted in FIG. 6, a user could easily move from the current file to, say, "MYLIST" 15, by simply depressing " ^ K", TABBING to "→MYLIST", and then pressing ENTER.

As will be described further below, the present program system can also be instructed to display the map during the time between displaying the referenced files, thus helping the user to maintain a perspective of his position with respect to the screens that he has been selecting. Similarly, this function can be turned off so that the map is not displayed except when specifically requested.

THE CLASSES, FORMS, MEANINGS, AND USES OF SYSTEM SYMBOLS

PART II

THE FILE SYMBOL (CONTINUED)

The file symbol has various other related uses in the program system other than those already specified in the explanation, above. For instance, in the event that the program system in unable to locate the file which is specified by name in the second part of the file symbol, the system will automatically create and display a new file by that name for the user. Whenever a new file is thus created, the system creates a default header record and flags the file as having a temporary header record. Of course, when the file is actually saved, the default header record will be re-generated and replaced in the file and copied into the file map.

Any newly created file will be identical in appearance to that as depicted in FIG. 1, except, of course, that the header record will reflect the name specified in that symbol. Thus, creating a new file is just a special instance of a user requesting to view any file in general: a user need only type a file symbol to correspond with the new file's name onto the screen, TAB to the new file symbol, and press ENTER; the same method is used to access a newly created file as to select and view any previously created file.

As is generally the case within the program system, if the user does not perform any edits or alterations on a newly created file, that file will neither be created nor stored on a disc or in auxiliary memory. Thus, if the user ESCAPES out of a newly created file without having entered any information on it, the file will not be created or saved.

For purposes of compatability, as further explained below, the current embodiment of the system will only accept as a valid file name those names that accord with generally accepted file naming standards, such as CP/M's , etc.,: any name up to eight characters in length, with an optional one to three additional characters following it, provided that the two groups are separated by a period.

The file symbol may also be used to generate directories representing available files via the use of wildcard assignments in the second part of the file symbol. Following the convention of CP/M, a "?" character would be employed to specify at most a single ambiguous character within the file name, while an "*" character would be employed to specify at most the total number of characters permitted in a valid file name. To formulate a file directory search a user would simply type onto the screen a file symbol with an ambiguously specified file name, e.g., "→*.*", TAB to that file symbol, and then press ENTER. However, the program system will not simply generate a directory of file symbols that satisfy the ambiguous request; rather, it generates and inserts into the file a directory of file symbols that satisfy the ambiguous format. A user is then free to select and view a file from the directory in the same manner that he selects any other file symbol, he TABS to the desired one and presses ENTER to view it. So, using the aforementioned example, a user could generate a directory of the file symbols representing all available files by exclusively using wildcard assignments in the second part of the file symbol, e.g., "→*.*". Alternatively, a user could, for example, generate a search of the file symbols representing all available files of a certain type, e.g. "→*.COM", by selectively using wildcard assignments within a file symbol.

THE DELETE-FILE SYMBOL

No system that automatically saves every newly created or edited version of a file would be complete without an equally uncomplicated method of erasing a file. Thus, the program system includes a DELETE-FILE SYMBOL 3 that, for purposes of convenience and compatability, is closely related in form to the file symbol. As shown in FIG. 2, it is also composed of two distinct parts: the first part, the "X→" prefix informs the system that this is a delete-file system symbol, while the second part, in the above example 'KEYS-TO-USE', specifies to the system specifically which file is to be acted upon if the symbol is invoked.

The implicit request contained in the delete-file symbol is for the program system to locate the file specified in the second part of the symbol and then "X-out", that is erase it, from disc or auxiliary memory. In the aforementioned example, if the user was viewing the file "SYMBOLS" as depicted in FIG. 2, TABBED to "X→KEYS-TO.USE" 3, and then pressed ENTER, the system would first locate the file "KEYS-TO.USE", and then permanently erase it from disc. If the system could not locate the file, an appropriate message would be issued to the user.

The delete-file symbol may be formed on a screen by either typing the entire symbol on the screen, or, if the file symbol of the file that is to be deleted is already in place on the screen, the user may simply place an "X" character in front of that file symbol.

An excellent example of the convenience and compatibility provided by the form of this symbol with the system in general will be demonstrated by the following, not too uncommon, situation. Suppose that a user decided to generate a complete file symbol directory, as explained above, to determine if any existing files were possible candidates for elimination from disk. Once the file symbol directory was generated, the system would insert the listing of compatible file symbols into the current file, the user would simply TAB through the directory to the first file symbol that represented a file that he wished to delete, place an "X" in front of that file's symbol, and press ENTER to instruct the system to erase the file from disc. Of course, as the user TABBED through the directory of file symbols he could instruct the system to display any file represented in the directory by simply pressing ENTER when its associated file symbol was appropriately highlighted by the symbol indicator.

As is often the case, if the user was uncertain, or simply curious, about the contents of a particular file whose corresponding file symbol had been TABBED to in the directory, the user could directly view the file from the directory by pressing ENTER, view the contents of the file, and ESCAPE back to the file containing the directory and continue the process without interruption, as when the user ESCAPED back, the file containing the directory would be redisplayed exactly at it was last viewed, including the exact position of the symbol indicator/cursor.

THE PROGRAM SYMBOL

The third system symbol listed in FIG. 2 is an example of the class of system symbols used to represent a computer program. The system's PROGRAM SYMBOL 4 is also composed of two distinct parts: the first part, the disc drive indicator, i.e., any letter from A–N, followed by the "greater than" sign, indicates to the program system that the symbol represents a program name, and the second part, in this example "ADDUP", indicates to the system specifically which program is represented. In general, any program name can be transformed into a system program symbol by adding the appropriate prefix, e.g., "A", to the program name.

The implicit request contained in a program symbol is for the program system to locate and run the program which is specified in the second part, of the program symbol. Thus, if a user TABBED to a program symbol and pressed ENTER, the program system would attempt to locate and then run the specified program. In the event that the program could not be located on the specific disc drive as indicated by the program symbol, the system would automatically search all other disc drives known to it in an attempt to locate the program before advising the user that the program could not be located.

There are three general options for the present program system when a program has been called up to run: the program system could be terminated by the computer's own operating system, the program system could remain resident, or the program system could continue to run with the program being performed as a subtask. This would be dependent on the particular hardware and pre-existing operating system in use, if any, and any one or more of these options could be used, depending on the particular environment under which the present program system was being run. If the program system were to be terminated under option 1, it would automatically save the latest status of the current file so that when the system was relocated, it would return to its exact state at prior termination, as explained above.

THE BLANK FIELD

The fourth example of a SYSTEM SYMBOL used in the program of system, as depicted in FIG. 3, is the BLANK FIELD or UNDERSCORE, "_____" 8. It must consist of at least one underscore bounded on both sides by blanks or the start or end of a line. These fields formally designate specific areas on a screen where additional information may be easily filled in. A user may TAB to a field and enter information directly over the underscored area, and continue to do so as many times as necessary, provided that at least one underscore in the field remains blank, by simply TABBING to the field and typing over the old information.

Although all blank fields are system symbols, i.e., they will be scanned for and identified by the TAB command, depending on the nature of the information to be entered into a blank field a field may or may not be executable by the system's ENTER command. The blank field, per se, does not have an execution request code associated with it. For example, if a file symbol, program symbol, or any other system symbol that was associated with its own execution subroutine in the system, was entered on a blank field, the field would then represent an executable field to the system, as the implicity request contained in any executable system symbol will always be carried out by the ENTER command. However, a field which requires, say, that the date on which a contract was signed be entered is not executable, at least from the standpoint of the system's ENTER command because it is simply an instance of normal text being entered into the field.

THE SYSTEM COMMAND SYMBOLS

The fifth system symbol listed in FIG. 2 is an example of the class of system symbols used to represent system commands. The system's SYSTEM COMMAND SYMBOL 5 is likewise composed of two distinct parts: the first part, "S>", indicates to the program system that the symbol represents a system command, and the second part, in this case "FORM", indicates to the program system which specific system command the symbol is to represent.

Generally, system commands are used either to alter the attributes of a screen or file, or to facilitate the use of the present program system for the user. They are thus an important class of symbols to the more sophisticated user of the program system. As each system command symbol carries its own implicit request, it will be necessary to explain them individually. However, as is the case with all classes of system symbols, a user need only type the desired system command symbol onto the screen, TAB to it, and then press ENTER to instruct the system to carry out the implied symbol.

The first group of system command symbols deals with the level of read/write protection of a screen. As explained above, when a screen is initially created, a user is free to edit or alter it in any fashion. However, instances may arise when it is not desirable to leave a screen fully alterable, e.g., screens designed to instruct a user in how to operate a computer (say at a computer store where an off-the-street customer might have a bit of mischief in his heart), or screens designed to solicit from a user only very specific information in very specific areas of a screen.

Thus, three basic levels of write protection for a screen would be desirable: (1.) no protection at all, i.e., the default condition, (2.) locked against any alterations, and (3.) locked against any alterations except for those areas designated by a blank field which would function like a form with fill-in-the-blank areas.

The program system allows a user to set a screen at any of these levels of write protection by invoking one of two system command symbols on the screen that the user chooses to protect. The first one is the READ ONLY command symbol, abbreviated as "S>RO". If this symbol was invoked on a screen, thereafter a user would be able to view, or read, that screen, but would not be permitted to edit that screen in any fashion whatsoever. The second symbol that could be invoked to alter the level of write protection on a screen is the fill-in-the-blank FORM command, abbreviated as "S>FORM". If this symbol was invoked on a screen, a user would only be allowed to enter information in those areas on that screen designated by blank fields. In the event that a user should attempt to edit a READ ONLY file, or edit a FORM file in an undesignated area, the program system would issue an appropriate message to the user.

Whenever the system command symbol to unlock a screen, "S>UNLOCK", is left on either a READ ONLY or FORM screen, the user may return the screen to its original, user-editable state by invoking that command in the normal operation of the program system, TABBING to the symbol and pressing ENTER.

It should be explicitly noted that no level of write protection on a screen will alter, or otherwise qualify, a user's ability to make use of the system's ESCAPE, TAB, and ENTER commands on that screen.

There is a second series of system command symbols in a particularly advantageous embodiment of this invention which can, when invoked, automatically simulate the program system's identification and execution commands, i.e., TAB and ENTER 1, on a given screen.

The system's default condition is provided to allow the user to TAB from symbol to symbol until he reaches the desired one, and then allows him to invoke the ENTER command to instruct the program system to display a different file, load a program, or do whatever that symbol implies to be done.

A second option is given by the system command ADVANCE, "S>ADV". Once invoked, the ADVANCE command instructs the system to advance automatically the symbol identifier to the next system symbol in the file after the system has finished carrying out the implied request of an executable system symbol on the screen; the program system simulates a manual TAB command each time a user invokes the ENTER command and the system has finished carrying out the implied request of the first system symbol. The system will then wait for the user's next input. If the user chooses to instruct the system to carry out the implied request of that next system symbol by pressing ENTER, the program system will again carry out the implied request, automatically TAB to the next system symbol on the screen, and wait for the user's next response. Alternatively, the user may choose to either TAB to some other symbol, or edit the screen. Although it is of limited use, the ADVANCE command does provide a simple means to verify that a given action designated on a screen has occurred.

A third option is given by the system command EXECUTE, "S>EXEC". Once this symbol is invoked, the program system will automatically advance the symbol identifier to, and execute, the next instance of an executable system symbol found in the file. The program system therefore simulates a manual TAB/ENTER couplet.

Both the ADVANCE and the EXECUTE system commands can be terminated anywhere on a screen by the system's STOP command, "S>STOP". Alternatively for the case where a screen is being controlled by the system's S>EXEC command, if the system encounters the end of a file without a STOP command, it will automatically perform an ESCAPE, redisplay the previously viewed file and terminate the auto-execute command. Of course, in the process of performing the ESCAPE, the present system will also save the latest status of the current file before ESCAPING back to the previously viewed one.

The third distinct group of system command symbols deal exclusively with the FILE MAP. The system command symbol "S>MAP" when invoked by the user will cause the map to be displayed like a file to the user and is identical in substance to the command "K^". The system command prefix, i.e., "S", followed by M-0 or M-1 would cause the map to be either temporarily displayed or not displayed between every screen, whichever would be of greater preference to the user.

There is, finally, a miscellaneous group of system command symbols which do not fall into any particular category. The first of these is the ESCAPE command, "S>ESC", which performs the same function as the ESCAPE key when invoked. One would use this symbol rather than the key particularly when the auto-execute mode is being used, thus explicitly instructing the program system to perform the ESCAPE request, and return to the previously viewed file.

The OPERATING SYSTEM system command, "S>OS", when invoked, enables a user to quit the TABTALK system and return to the pre-existing operating system of the computer. The use of this symbol necessarily presupposes of course that there is a pre-existing operating system for the user to drop into and is thus highly dependent on the particular computer system for successful execution.

The final system command symbols used in the preferred embodiment of the system of the instant invention are represented by the SYSTEM ALTERATION COMMAND SYMBOL, "S>Tx". These commands allow a user to integrate one or more system symbols of his own design and meaning into the program system, unlike all other system command symbols however, at the present time the use of these commands requires that a user be skilled in the art.

To integrate a system symbol of his own choice into the program system, a user will have to specify the following information: (1.) the method in which the symbol would be identifiable from any other form of information, e.g., a unique prefix, or, alternatively, the user could specify the address of the routine which can identify the symbol, (2.) specify the symbol's attributes, i.e., whether the symbol is to be identifiable by the system's TAB command or executable by the system's ENTER command, (3.) specify the message, if any, to be displayed by the system when a user TABS to the symbol, and (4.) specify the address of the symbol's execution subroutine. In the preferred embodiment, the user would specify this information in machine language, although different versions of the program system would also accept hexidecimal notation of machine language, etc.

After a user furnished this information on the screen, he would simply TAB to the symbol and press ENTER to instruct the program system to integrate the new symbol into the system.

NOTE AND TIME FIELD

The next two system symbols listed in FIG. 2 are the NOTE FIELD 6 and the TIME FIELD 7. The NOTE FIELD 6 is distinguished in this embodiment by the use of a double asterisk, "**", while a TIME FIELD 7 takes the form of AB:CD, where A, B, C, and D are integers.

When a note or time field is TABBED to, the program system will cause the symbol and the remainder of the text immediately following the symbol on the same line to be highlighted by the block cursor. Thus, these two symbols easily lend themselves for such uses as keepig a position on a checklist or schedule.

Like the blank field, neither one of these two fields is associated in the system with an execution subroutine. If a user pressed ENTER while the block cursor was resting on either of these types of fields, the system would ignore the user's request and issue a message advising him of the futility of his invoking the ENTER command. The only exception to this case is when the highlighted field includes an executable system symbol. The program system will then "advance" the block cursor so that it highlights only the executable system symbol and query the user as to whether or not the user had that symbol in mind when he invoked the ENTER command. The user would then be required to reinvoke the ENTER command if such was the case.

THE TELEPHONE DIALING SYMBOL

The final system symbol listed in FIG. 3 is the TELEPHONE DIALING SYMBOL 9. Like most of the other system symbols, it is composed of two distinct parts. The prefix, "T>", indicates to the system that the symbol is indeed a telephone dialing symbol, while the second part specifies the particular telephone number represented by the symbol.

The implicit request contained in the telephone dialing symbol is for the system to cause the telephone number specified in the second part of the symbol to be dialed automatically on a modem appropriately connected to the computer system. The execution subroutine associated with this symbol contains provisions so that any dashes or parentheses used in the second part of the symbol would be, of course, ignored.

INTEGRATION OF SYSTEM-EXTERNAL FILES

It will be apparent to those skilled in the art that, as the program system of the present invention stores all interfaces created within the system in the form of a file, that a user can easily integrate any externally-created file for use in the system. Basically, the user need only designate a file symbol specifying the externally-created file's name in the second part of the symbol and invoke that symbol to bring up that file within the program system. The system will in turn, as in the case of a newly created file, generate a default header record and flag the file as possessing a temporary header record until the file is saved by the system, at which time the header record will be updated and replaced in the file map.

Relatedly, in the preferred embodiment, the program system will only accept generally accepted file-naming standards in the second part of a file symbol. Although there is nothing inherent in the system which would necessitate that a file name be so limited, this provision was designated to ensure compatibility between system-created files and system-external programs or operating systems, e.g., a user could edit, or use, a system-file outside of the system.

CAVEATS TO THE PREFERRED EMBODIMENT

It will of course be appreciated by those skilled in the art that the system of instant invention is not limited to the precise embodiment disclosed. More specifically, it is to be understood that user input could come through voice recognition, a "mouse", a joy stick, a hand-held control unit with as few as two or three buttons, a touch sensitive screen, other keys available on the keyboard, or any other available means. Similarly, output to the user need not be respected to a visual display unit and could also include printers, voice, a tactile display as for blind people, liquid crystal display, or other means. In fact, in the actual version of the current preferred embodiment, the three basic program system commands, i.e., TAB, ENTER, and ESCAPE may also be invoked from a three-button mouse.

Likewise, the symbol indicator need not take the form of a block cursor. Clearly any other form of identification, such as bracketing or underlining a symbol, or a blinking cursor, etc., could be used depending upon available hardware.

More importantly, it is to be understood that within the instant invention any class of system symbols may be implemented with any unique distinguishing form whatsoever. For example, a system symbol need not be composed of a distinct prefix (indicating the specific class of system symbol) followed by a name indicating which specific instance of the class the symbol was to represent) as was used in the preferred embodiment. These specific forms were employed solely because they facilitated a human user in visually distinguishing one class of symbols from another easily on a visual display screen. Their related forms, e.g., the file symbol vis-a-vis the delete-file symbol, are also conducive to a user remembering their form. However, any other consistent and unique method could be employed for any class of system symbols e.g., a postfix, a color code in those computers systems with a multi-color display, an invisible control code or other code related to the symbol.

In a graphics system, pictures/icons could of course be used. Taking the telephone dialing symbol as an example, the instant invention's symbol identification routines could be instructed that any series of characters composed of seven or more consecutive numeric digits, ignoring dashes or parentheses only, is to be considered the telephone dialing symbol. Therefore, either 299-722-7255, or for that matter (299)-722-7255, would be used in place of T>299-722-7255; regardless that the telephone number and the system symbol representing it on a screen would be one and the same. All that is necessary is that there be a subroutine within the symbol identification routines that can distinguish and identify the system symbol from anything else that a user may wish to designate on a screen whenever a user invokes the TAB command.

Mention has already been made that a user skilled in the art may, be means of the system alteration command, integrate any other command to the computer or its related peripherals in the form of a system symbol identifiable and executable to the system. Therefore, it will only be briefly noted here that the system of the invention is, obviously, not limited to those system symbols or commands as described above in the current preferred embodiment. Any command to a computer or its related peripherals may be incorporated into the system as a system symbol provided that its form, characteristics, and associated implicit command are appriopriately defined to the system of the present invention, as discussed above.

DEVICES WITH AN EMBEDDED COMPUTER

It will of course also be appreciated by those skilled in the art that the system of the present invention is not limited for use in general-purpose computers. The system could be used in virtually any device with an embedded computer, and especially in those that required user interaction.

The method of implementation of the system of the instant invention in any of these devices differs from that of the preferred embodiment only in that many of these device would have limited input capability available to the end user. This would then require that screens be predesigned on any other system with more complete input, i.e., word processing, capabilities. These predesigned screens could of course be locked into the device itself or transmitted to the device's computer as a data stream.

In fact, since the system of the instant invention allows a user to use, operate, or control a computer with as little as two or three input actions, this system is ideally suited to simplify the use of many of these devices. In addition, the program system could be customized for the use in any such device as it is capable of integrating any command into its system, as previously explained. Only one brief example will be listed as the possibilities are significant in number.

The present program system could easily and inexpensively be implemented to remote-control and/or to pre-program a computerized television. In such a system, one station in a given locality would continuously broadcast a listing of programs currently available over the air or on cable. Instead of simply listing a channel number next to the television program's name, this listing would designate the channel number in the form of a system symbol, similar to the listing of files in the file map. A user could then, by means of a three-key remote control device, choose to view any program listed on that screen. In effect, the user would TAB to the symbol representing the channel that he wished to view, press ENTER to view its associated television program, and, press ESCAPE once to return back to that station broadcasting the program listing. If a user had fuller input capabilities, additional choice would be open to him. For instance, he could prepare in advance a screen specifying exactly which programs were to be "displayed" on the television screen. In addition, as any busy parent might well appreciate, such a screen could be locked against alterations.

Figure 9:
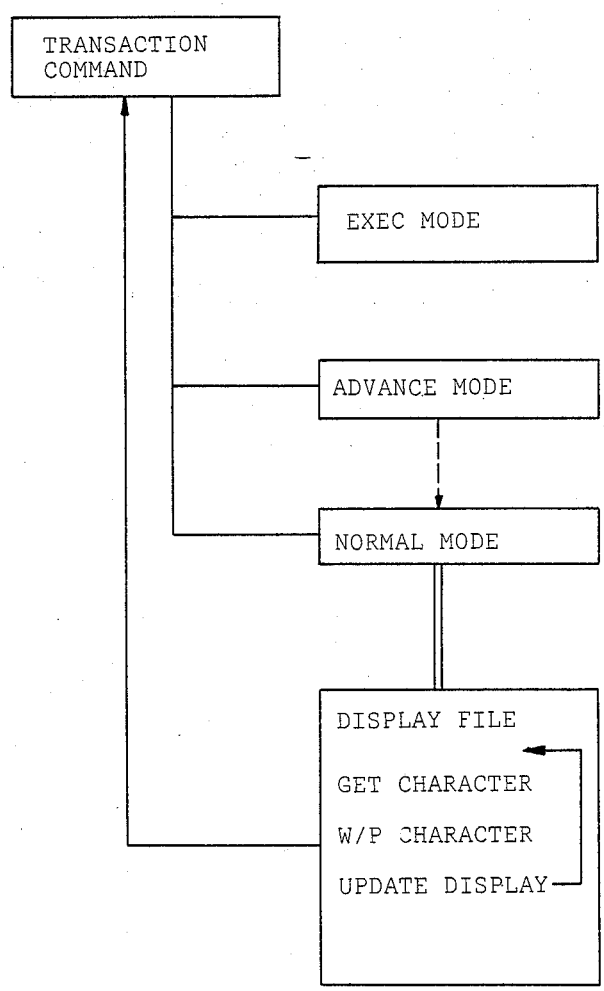
FIG. 9 is a simplified function block diagram of the transact function in FIG. 8.
Figure 10:
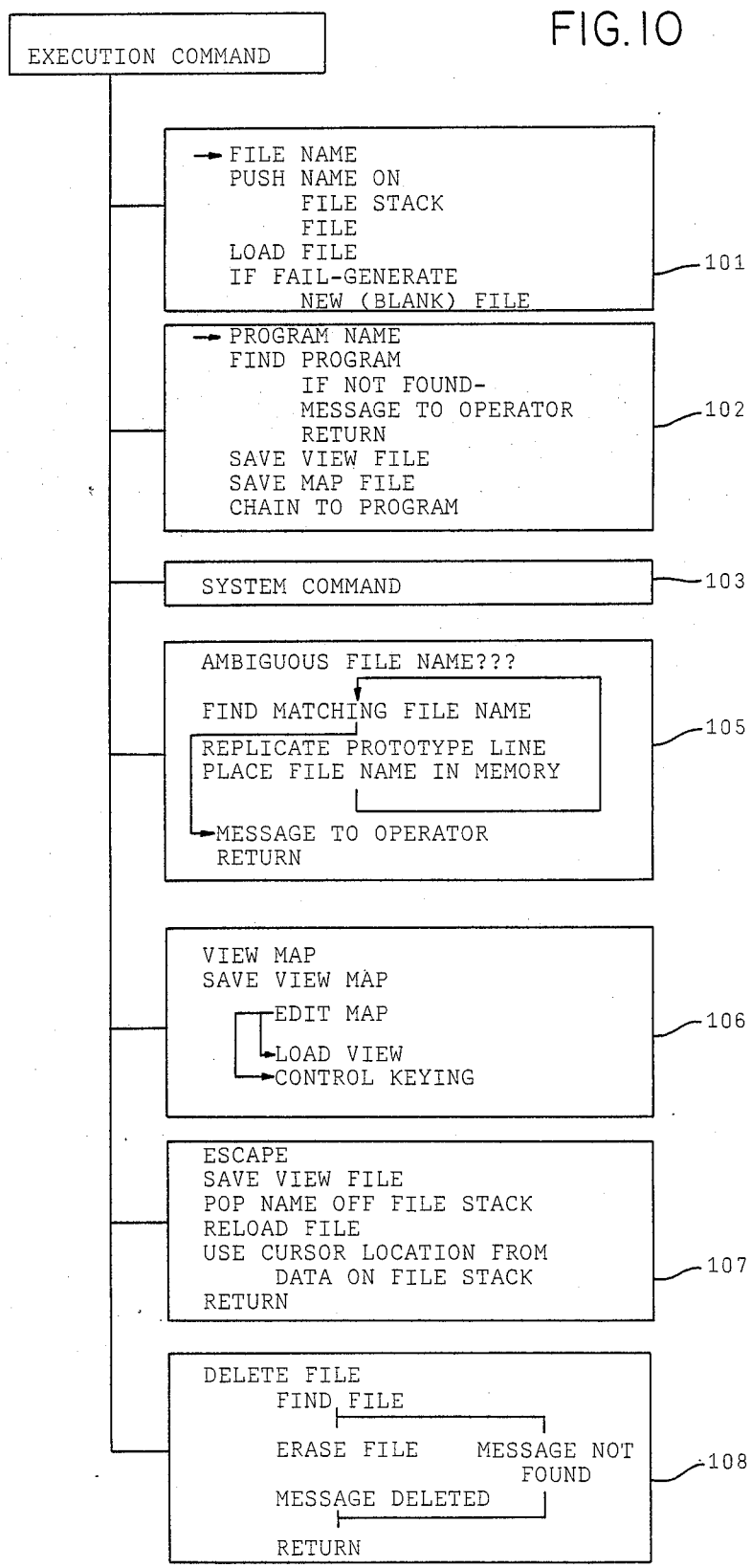
FIG. 10 is a function block diagram of the execute function in FIG. 8.

FIGS. 8, 9, and 10 are function block representations of a specific illustrative embodiment of the invention. FIG. 8 is a highly simplified function block diagram of the overall program system of the invention. First, the program system is initiated by loading a map file 20, and a view file 21 which corresponds to the file last being examined prior to a termination. After such filing, the process continues to a main loop 22 which is essentially a couplet of transaction and execution commands.

FIG. 9 illustrates a specific embodiment of the functioning of the computing machine during the transaction process which is initiated in response to the transaction command of FIG. 8. As shown in FIG. 9, this particular embodiment utilizes three modes 30, the EXEC mode, ADVANCE mode, and the NORMAL MODE 31. As previously indicated, the EXEC MODE 30 corresponds to the equivalent to automatic TAB and automatic RETURN key actuations. The ADVANCE MODE 31 corresponds to the equivalent of an automatic TAB key actuation, but requires a manual actuation of the RETURN key. It should further be noted with respect to the ADVANCE MODE 31 that the automatice actuation of the TAB key returns control to NORMAL MODE 32 until the RETURN is actuated, at which time control returns to the ADVANCE MODE 31. The NORMAL MODE 32 of operation is the mode during which files can be edited, and corresponds to manual actuation of the TAB and the RETURN keys.

During operation of the transaction process, and in response to actuation of the RETURN key, the transaction process will perform any of several functions, such as display a file, word process a character, and update the display accordingly. Upon completion of the desired functions, control is return to the transaction process which then may relinquish control to the execution process in accordance with FIG. 9.

FIG. 9 is a specific embodiment of the execution process which is initiated in response to the execution command of FIG. 8. As shown in FIG. 10, the execution process may entail operating on a file which is called by name, in accordance with subprocess 101. Such functions in the subprocess may include inserting the file name onto the file stack, loading the file, and if the file is not available, generate a blank file. Alternatively, the execution process may be called upon to execute a program by name, as shown in subprocess 102. In this case, the program is searched for, and if it is not found, a message is returned to the operator. Visually, the view file and the map file are saved and provided to the program being executed, if necessary. Subprocess 103 illustrates that the execution process may be called upon to execute on a system command of the type of which have been described hereinabove.

In the event that an ambiguous file name is requested to be executed upon, as shown in subprocess 105, the execution process will search for a matching file name.

If such a file is not found, a message is returned to the operator. However, if a matching file name is found, then the execution process will replicate the prototype line as discussed hereinbefore, and place the file name in a line.

In accordance with subprocess 106, the execution process may be called upon to find the file map and present it to the operator. Since this is an operation which occurs quite frequently during the practice of the invention, certain embodiments of the invention may be provided with a simplified key stroke sequence, such as the actuation of the CONTROL and K keys simultaneously, to return the file map to the output where it will be available to the operator. This simplified sequence will avoid the need to incorporate a system command pertaining to recall of the file map in each file, TABbing to such a system command and executing this function.

ESCAPE subprocess 107 permits the operator to escape from a file. However, as indicated in this figure, several process steps are required to insure that the information in the file is preserved. Such information may include, in certain embodiments, the location of the cursor. However, it is to be understood that in the practice of this invention, and as it is described herein, the term "cursor" is not limited to an indicator on the display, but also to any signal, irrespective of whether it is perceptible to the operator, which indicates the location where the operator was working, within that file, prior to termination or escape.

During operation of 108 which causes a file to be deleted, if the file desired to be deleted is found, it is erased and a message indicating deletion thereof is displayed or otherwise made available to the operator. Alternatively, of course, the file may not be found. However, in either case, control is required to the transaction process, in accordance with the flow sequence of FIG. 8.

Although the invention has been described in terms of specific embodiments and applications, persons skilled in the art, in light of this teaching, can generate additional embodiments without exceeding the scope or departing of the spirit of the claimed invention. Thus, persons of skill in the art can generate systems wherein the present invention can be used to control computing and other types of machines which operate within the constraints of predetermined system functions, such as multichannel transmission systems and multifunction switching systems.

Accordingly, the drawings and descriptions in this disclosure are proffered to facilitate comprehension of the invention and should not be construed to limit the scope thereof.

What is claimed is:

1. A method of operating a computer system having at least a processor, display means, input means, and memory means for storing one or more information files, each of said files containing data and optionally containing a sequence of processor detectable operational symbols intermixing with said data, said method comprising the steps of:

A. storing data for:
      i. defining a number of generic categories of functions performed by the processor, each of said generic categories of functions has a corresponding generic operation symbol that can be perceived by the user and detected by the processor;
      ii. defining a series of operations to be used by the processor to identify the generic category of each of said generic operational symbol within the context of said files irrespective of the other contents of said files;
      iii. defining a series of operations to be used by the processor to extract specific elaboration of said generic function from an explicit operational symbol selected by the user;
      iv. defining a series of operations to be used by said processor to determine whether a specific function corresponding to a given explicit operational symbol is available within said processing means or said information storage means;
      v. defining a series of operations to be used by said processor to indicate upon said display means a specific selected operational symbol; and thereafter
   B. receiving a user inputted initiation signal;
   C. responding to said initiation signal to cause said processor to retrieve from said memory means, and present on said display means, the content of all or part of a predetermined one of said files, and to display a cursor signal at an initial location in said displayed file; and thereafter
   D. receiving a first user inputted mode signal for selecting either a text mode or search mode;
   E. responding to said mode selecting signal by either:
      (1) performing step F. below, if text mode was chosen; or
      (2) performing step G. below, if search mode was chosen;
   F. receiving text data from said user via said input means;
   G. using processor controlled search means to begin at a current cursor position on a displayed file and scan through said displayed file until detection of either an operational symbol or and endfile marker;
   H. if an endfile marker is detected in step G. above, then:
      (1) presenting a message on said display indicating non-existence of an operational symbol in said displayed file; and,
      (2) performing step F. above;
   I. if an operational symbol is detected in step G. above, then:
      (1) moving the cursor to the position of said operational symbol in the displayed file; and,
      (2) receiving a second user inputted mode signal for selecting either a text mode, search mode, or execute mode;
   J. if a text mode signal is received in step I(2), then performing step F. above;
   K. if a search mode signal is received in step I(2), then repeating step G. above;
   L. if an execute mode signal is received in step I(2), then, if possible, executing the function corresponding to the detected operational symbol;
   M. whereby said computer system is controlled by user entered text data, or by function calls requiring minimal user input, or by a combination of textual input and such function calls.

2. The method of claim 1 wherein the search mode signal is inputted by a distinct input from the user of said system.

3. The method of claim 1 wherein the selected operational symbol is an elaborated operational symbol and said step 2. further comprises the steps of:

i. determining whether a file corresponding to the selected elaborated operational symbol exists;
ii. locating said file within said computer system;
iii. providing access to said file.

4. The method of claim 1 wherein operational symbols further comprises of characters which is inputted through the input means.

5. The method of claim 1 wherein the generic category of each of said operational symbol is identified by a prefix or suffix affixed to the elaboration of said operational symbol.

6. The method of claim 1 wherein the selected operational symbol belongs to a generic category of operational symbols pertaining to the presentation of data upon the display means and said step L. further comprises the step of presenting via the display means a specific file or group of data corresponding to the selected elaboration of said generic operational symbol.

7. The method of claim 6 wherein said data is a text file.

8. The method of claim 6 where said data is in the form of a video image or sequence of video frames.

9. The method of claim 1 wherein the selected operational symbol belongs to a generic category of operational symbols pertaining to the presentation of data upon the display means whereby the selected operational symbol is an incompletely elaborated operational symbol; said performing step further comprises the steps of:
i. determining which of the names of the files available upon said memory means match the incompletely elaborated operational symbol;
ii. inserting a list of files found by step i. into the current file as completely elaborated operational symbols which can be detected by the processor.

10. The method of claim 1 wherein the selected operational symbol belongs to a generic category of operational symbols pertaining to executing program stored within said memory means and said performing step further comprises the step of executing the program specified in the specific elaboration of said operational symbol.

11. The method of claim 1 where in the selected operational symbol belongs to a generic category of operational symbols pertaining to transmission of information to peripheral devices attached to said computer system and said step L. further comprises the step of transmitting specific information incorporated or referred to by said selected operational symbol to said peripheral devices.

12. The method of claim 11 wherein the peripheral devices include a modem and said specific information consists of the instructions necessary for said modem to dial a telephone number.

* * * * *